US012670884B2

(12) United States Patent
Wang et al.

(10) Patent No.: US 12,670,884 B2
(45) Date of Patent: Jun. 30, 2026

(54) METHOD, APPARATUS, DEVICE, AND MEDIUM FOR COMPENSATING BRIGHTNESS

(71) Applicant: KunShan Go-Visionox Opto-Electronics Co., Ltd, Kunshan (CN)

(72) Inventors: Hongyu Wang, Kunshan (CN); Chong Han, Kunshan (CN)

(73) Assignee: KunShan Go-Visionox Opto-Electronics Co., Ltd, Kunshan (CN)

( * ) Notice: Subject to any disclaimer, the term of this patent is extended or adjusted under 35 U.S.C. 154(b) by 1 day.

(21) Appl. No.: 18/436,493

(22) Filed: Feb. 8, 2024

(65) Prior Publication Data

US 2024/0177688 A1 May 30, 2024

Related U.S. Application Data

(63) Continuation of application No. PCT/CN2022/121913, filed on Sep. 27, 2022.

(30) Foreign Application Priority Data

Jun. 14, 2022 (CN) ......................... 202210668572.1

(51) Int. Cl.
*G09G 5/10* (2006.01)
*G09G 3/3225* (2016.01)

(52) U.S. Cl.
CPC ............. *G09G 5/10* (2013.01); *G09G 3/3225* (2013.01); *G09G 2320/0233* (2013.01); *G09G 2360/16* (2013.01)

(58) Field of Classification Search
None
See application file for complete search history.

(56) References Cited

U.S. PATENT DOCUMENTS

2013/0027383 A1* 1/2013 Odawara .............. G09G 3/3233 345/212
2016/0027354 A1 1/2016 Terai et al.
(Continued)

FOREIGN PATENT DOCUMENTS

CN 104867455 A 8/2015
CN 104867455 B 5/2017
(Continued)

OTHER PUBLICATIONS

Tsujimura, "OLED Display Fundamentals and Applications", Wiley Series in Display Technology, Second Edition, 2017, 298 pages.
(Continued)

*Primary Examiner* — Andre L Matthews
(74) *Attorney, Agent, or Firm* — Maier & Maier, PLLC

(57) ABSTRACT

A method, apparatus, device, and medium for compensating brightness. The method includes: arranging a plurality of first anchor points and at least one fixed anchor point in a display area of a display panel; dividing the display area of the display panel into a plurality of adjustment areas each including at least one of the first anchor points, and determining a first compensation gain for each of the adjustment areas under a grey scale image to be compensated; determining a second compensation gain corresponding to the first anchor point according to a brightness value corresponding to the first anchor point, a brightness value corresponding to the fixed anchor point, and the first compensation gain of the adjustment area to which the first anchor point belongs; and performing brightness compensation on a pixel corresponding to the first anchor point according to the second compensation gain.

20 Claims, 13 Drawing Sheets

(56) References Cited

U.S. PATENT DOCUMENTS

| | | | | |
|---|---|---|---|---|
| 2019/0066627 | A1 | 2/2019 | Wang | |
| 2019/0139470 | A1* | 5/2019 | Yoo | H04N 13/133 |
| 2020/0226990 | A1* | 7/2020 | Jun | G09G 5/14 |
| 2020/0279518 | A1* | 9/2020 | Pyo | G09G 3/2074 |
| 2021/0264830 | A1* | 8/2021 | Lee | G09G 3/2092 |
| 2024/0046898 | A1* | 2/2024 | Harada | G09G 3/3607 |
| 2024/0144890 | A1* | 5/2024 | Wang | G09G 3/3426 |

FOREIGN PATENT DOCUMENTS

| | | | |
|---|---|---|---|
| CN | 107316601 | A | 11/2017 |
| CN | 108269529 | A | 7/2018 |
| CN | 108510431 | A | 9/2018 |
| CN | 111009207 | A | 4/2020 |
| CN | 111710277 | A | 9/2020 |
| CN | 111754942 | A | 10/2020 |
| CN | 111968583 | A | 11/2020 |
| CN | 112509514 | A | 3/2021 |
| CN | 114898714 | A | 8/2022 |
| EP | 3886082 | A1 | 9/2021 |
| JP | 2008145471 | A | 6/2008 |
| KR | 20080001171 | A | 1/2008 |
| KR | 20170080889 | A | 7/2017 |

OTHER PUBLICATIONS

Notification to Grant Patent Right For Invention issued on Jun. 21, 2023, in corresponding Chinese Application No. 202210668572.1, 6 pages (partial English translation provided).

Office Action issued on Mar. 7, 2023, in corresponding Chinese Application No. 202210668572.1, 11 pages (partial English translation provided).

International Search Report mailed on Mar. 3, 2023, in corresponding International Application No. PCT/CN2022/121913, 5 pages.

Office Action issued on Mar. 7, 2025, in corresponding Korean Application No. 10-2024-7004565, 6 pages.

Extended Search Report issued on May 2, 2025, in corresponding European Application No. 22946510.9, 14 pages.

* cited by examiner

METHOD, APPARATUS, DEVICE, AND MEDIUM FOR COMPENSATING BRIGHTNESS

CROSS REFERENCE TO RELATED APPLICATION

The present application is a continuation application of International Application No. PCT/CN2022/121913 filed on Sep. 27, 2022, which claims priority to Chinese Patent Application No. 202210668572.1 filed on Jun. 14, 2022, both of which are incorporated herein by reference in their entireties.

TECHNICAL FIELD

The present application relates to the field of display technology, and particularly to a method, apparatus, device, and medium for compensating brightness.

BACKGROUND

With the rapid development of display technology, display demands such as large size, high resolution, ultra-narrow frame, ultra thinness, and wide color gamut appear, which makes it more difficult for the panel manufacturers to control the manufacturing process. Moreover, deviations in the controlling of the manufacturing process also tend to enlarge the optical characteristic difference of the panel. For example, IR Drop (voltage drop) deteriorates the brightness uniformity of the display panel, which causes obvious visual unevenness and seriously affects quality of the product.

SUMMARY

Embodiments of the present application provide a method, apparatus, device, and medium for compensating brightness, which can improve the display uniformity of the display panel.

In a first aspect, the embodiments of the present application provide a method for compensating brightness, including: arranging a plurality of first anchor points and at least one fixed anchor point in a display area of a display panel; dividing the display area of the display panel into a plurality of adjustment areas each including at least one of the first anchor points, and determining a first compensation gain for each of the adjustment areas under a grey scale image to be compensated; determining a second compensation gain corresponding to the first anchor point according to a brightness value corresponding to the first anchor point, a brightness value corresponding to the fixed anchor point, and the first compensation gain of the adjustment area to which the first anchor point belongs; and performing brightness compensation on a pixel corresponding to the first anchor point according to the second compensation gain.

In a second aspect, the embodiments of the present application provide an apparatus for compensating brightness, including: an anchor point arrangement module configured to arrange a plurality of first anchor points and at least one fixed anchor point in a display area of a display panel; a first compensation gain determination module configured to divide the display area of the display panel into a plurality of adjustment areas each including at least one of the first anchor points, and determine a first compensation gain for each of the adjustment areas under a grey scale image to be compensated; a second compensation gain determination module configured to determine a second compensation gain corresponding to the first anchor point according to a brightness value corresponding to the first anchor point, a brightness value corresponding to the fixed anchor point, and the first compensation gain of the adjustment area to which the first anchor point belongs; and a compensation module configured to perform brightness compensation on a pixel corresponding to the first anchor point according to the second compensation gain.

In a third aspect, the embodiments of the present application provides an electronic device, including: a processor and a memory storing computer program instructions, in which the processor, when executing the computer program instructions, implements the method for compensating brightness of any one of the embodiments of the first aspect.

In a fourth aspect, the embodiments of the present application provide a computer-readable storage medium storing computer program instructions thereon, in which the computer program instructions, when executed by a processor, implement the method for compensating brightness of any one of the embodiments of the first aspect.

In the method, apparatus, device, and medium for compensating brightness according to the embodiments of the present application, a plurality of first anchor points and at least one fixed anchor point are arranged, which means the grey scale image to be compensated is segmented, and not only the first compensation gain for the adjustment area is determined, but also the second compensation gain corresponding to the first anchor point is determined based on the first compensation gain. Therefore, the gain corresponding to the first anchor can be dynamically adjusted, so that an accurate, efficient, refined and highly targeted uniformity compensation can be achieved for different brightness trends, including abnormal brightness trends, and thus the display uniformity of the display panel is improved.

BRIEF DESCRIPTION OF THE DRAWINGS

Other features, objects and advantages of the present application will become more apparent from reading the following detailed description of the non-limiting embodiments with reference to the accompanying drawings, in which the same or similar reference numerals represent the same or similar features, and the accompanying drawings are not drawn to actual scale.

DETAILED DESCRIPTION

Figure 1:
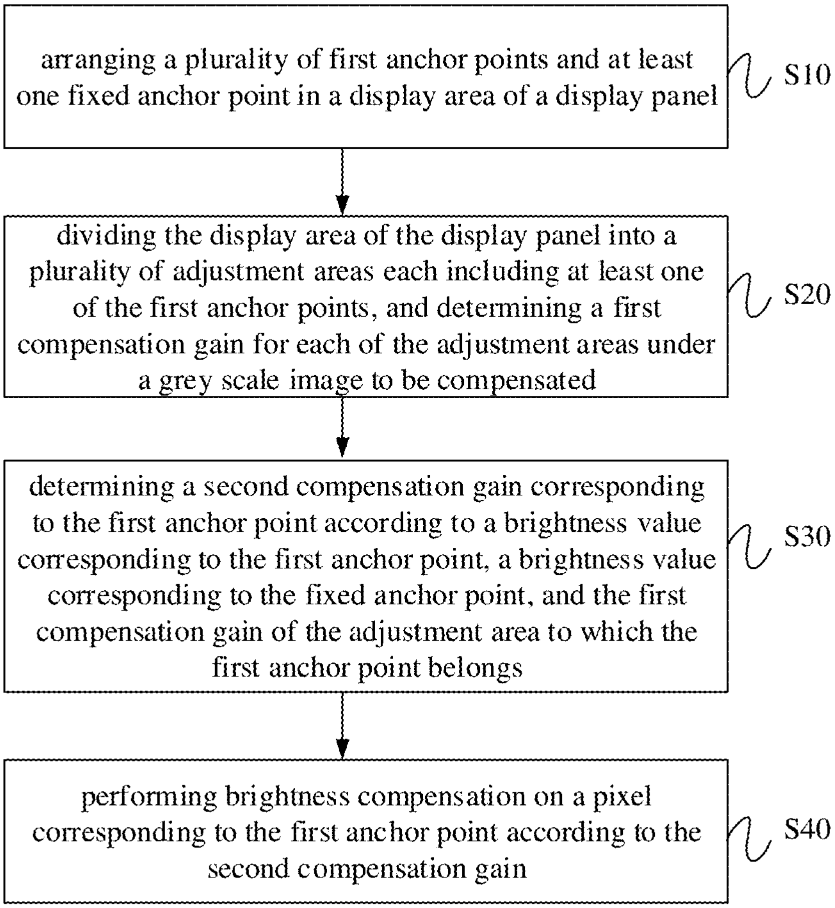
FIG. 1 shows a flowchart of a method for compensating brightness according to an embodiment of the present application.

Features and exemplary embodiments of various aspects of the present application will be described in detail below. In order to make the objects, technical solutions and advantages of the present application clearer, the present application is further described in detail below with reference to the accompanying drawings and specific embodiments. It should be understood that the specific embodiments described herein are only used to explain the present application, but not to limit the present application. For those skilled in the art, the present application can be implemented without some of these specific details. The following description of the embodiments is only to provide a better understanding of the present application by illustrating examples of the present application.

It should be noted that, in the present application, the relational terms, such as first and second, are used merely to distinguish one entity or operation from another entity or operation, without necessarily requiring or implying any actual such relationships or orders for these entities or operations. Moreover, the terms "comprise", "include", or any other variants thereof, are intended to represent a non-exclusive inclusion, such that a process, method, article or device including a series of elements includes not only those elements, but also other elements that are not explicitly listed or elements inherent to such a process, method, article or device. Without further limitation, an element preceded by "including . . . " does not exclude presence of additional similar elements in a process, a method, an article or a device including the element.

It should be understood that the term "and/or" as used herein only refers to an association relationship for describing the associated objects, which may include three possible relationships. For example, "A and/or B" may represent: A alone, both A and B, and B alone. In addition, the character "/" herein generally represents that there is an "or" relationship between the associated objects preceding and succeeding the character "/" respectively.

It is apparent to those skilled in the art that various modifications and variations can be made to the present application without departing from the gist or scope of the present application. Accordingly, the present application is intended to encompass the modifications and variations to the present application that fall within the scope of the appended claims (the claimed technical solutions) and equivalents thereof. It should be noted that the implementations provided by the embodiments of the present application may be combined with one another if there is no conflict.

Before the technical solutions provided by the embodiments of the present application are described, the problems in the art are first described in the present application to facilitate the understanding of the embodiments of the present application.

The Organic Light Emitting Diode (OLED) display panel has the advantages such as self-luminous, rapid responding, high brightness and thinness, and has become the mainstream in the display field. The OLED display panel is driven by a current to display, which provides a voltage to a sub-pixel from the driving chip (IC) side and through a power supply wiring (ELVDD wiring). However, the ELVDD wiring definitely has a certain impedance, which results in that the actual current for sub-pixels at different locations are different from the theoretical current, and thus further affects the brightness uniformity of the display panel.

The inventor has found that, in addition to the normal situations, for example, a sub-pixel close to the IC side is relatively bright and a sub-pixel far from the IC side is relatively dark, the display panel may present some abnormal brightness trends, for example, a sub-pixel on the left is relatively bright and a sub-pixel on the right is relatively dark, a sub-pixel on the upper side is relatively bright and a sub-pixel on the lower side is relatively dark, a sub-pixel at one end of a diagonal is relatively bright and a sub-pixel at the other end of the diagonal is relatively dark, and the like. In the related arts, no expected uniformity compensation can be achieved for the abnormal brightness trends, and even the display uniformity compensation is weakened or reversed, which further affects the uniformity compensation effects.

In order to solve the problems described above, the embodiments of the present application provide a method, apparatus, device and medium for compensating brightness, which will be described below with reference to the accompanying drawings.

As shown in FIG. 1, the method for compensating brightness according to the embodiments of the present application may include steps S10 to S40.

- S10: arranging a plurality of first anchor points and at least one fixed anchor point in a display area of a display panel.
- S20: dividing the display area of the display panel into a plurality of adjustment areas each including at least one of the first anchor points, and determining a first compensation gain for each of the adjustment areas under a grey scale image to be compensated.
- S30: determining a second compensation gain corresponding to the first anchor point according to a brightness value corresponding to the first anchor point, a brightness value corresponding to the fixed anchor point, and the first compensation gain of the adjustment area to which the first anchor point belongs.
- S40: performing brightness compensation on a pixel corresponding to the first anchor point according to the second compensation gain.

Specific implementations of the steps S10 to S40 will be described in detail below.

In the method for compensating brightness according to the embodiments of the present application, a plurality of first anchor points and at least one fixed anchor point are arranged, which means the grey scale image to be compensated is segmented, and not only the first compensation gain for the adjustment area is determined, but also the second compensation gain corresponding to the first anchor point is determined based on the first compensation gain, Therefore, the gain corresponding to the first anchor can be dynamically adjusted, so that an accurate, efficient, refined and highly targeted uniformity compensation can be achieved for different brightness trends, including abnormal brightness trends, and thus the display uniformity of the display panel is improved.

Specific implementations of the above steps are described below.

Firstly, S10 is described.

It may be appreciated that the second compensation gain corresponding to the first anchor point may be dynamically adjusted. The compensation gain corresponding to the fixed anchor point may be a constant gain and does not change as the compensation algorithm changes. For example, the compensation gain corresponding to the fixed anchor point may be determined according to actual requirements.

Exemplarily, the first anchor point may be located at an edge of the display area, and a plurality of first anchor points may surround the fixed anchor point. Thus, the fixed anchor point is located at approximately the center of the display area. Under a condition that a plurality of first anchor points surround the fixed anchor point, since the compensation gain corresponding to the fixed anchor point may be a constant gain, the second compensation gain corresponding to the first anchor point may be dynamically adjusted, that is, the brightness of the edge of the display area may be adjusted, for example, the brightness of the edge of the display area is increased or decreased to be consistent with the brightness at the center.

As an example, a plurality of first anchor points may be uniformly distributed at the edge of the display area. The first anchor point may be arranged at a corner of the display area, and if the display area is rectangular in shape, the first anchor point may be arranged at each of the four corners of the display area.

Exemplarily, the plurality of first anchor points and the at least one fixed anchor point may be generally uniformly distributed in the display area.

Figure 2:
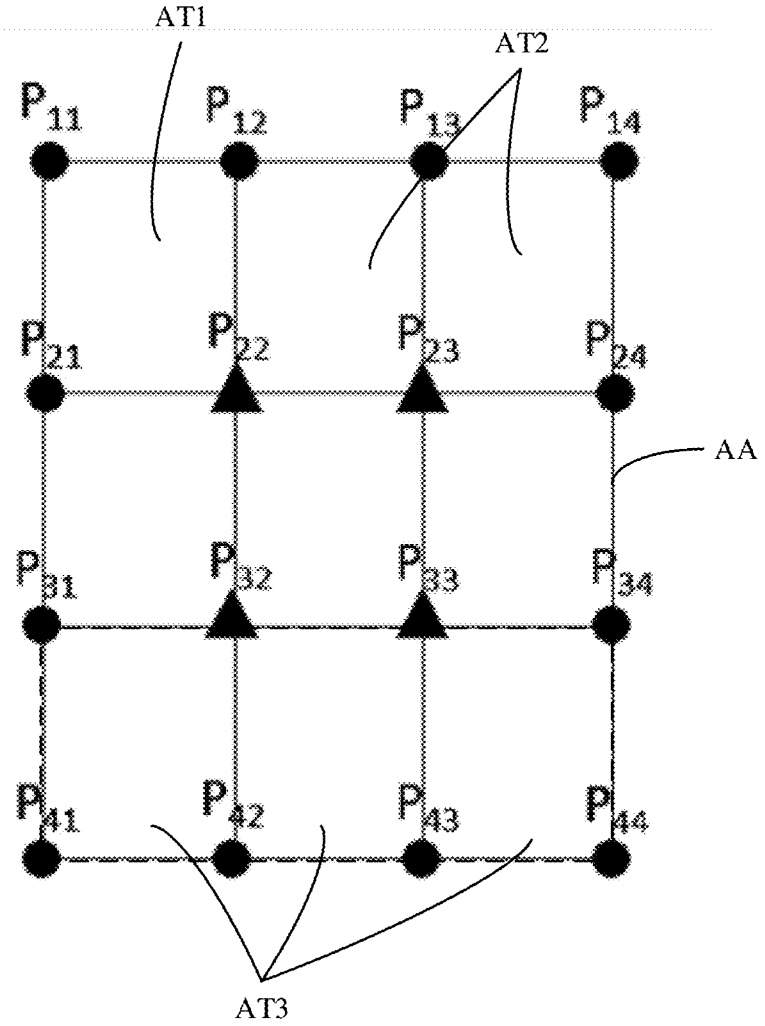
FIG. 2 shows a schematic diagram of an arrangement of anchor points in a method for compensating brightness according to an embodiment of the present application.

For example, the first anchor point and the fixed anchor point may be arranged according to the shape and size of the display area. As an example, as shown in FIG. 2, the display area AA is rectangular in shape, and 12 first anchor points and 4 fixed anchor points may be arranged and divide the display area into 9 subareas in 3 rows and 3 columns. Herein, P11, P12, P13, P14, P21, P24, P31, P34, P41, P42, P43 and P44 represent the first anchor point, and P22, P23, P32 and P33 represent the fixed anchor point.

The subarea located in the second row and the second column, i.e., at the center, may be enclosed and formed by the four fixed anchor points. Of course, more first anchor points and/or more fixed anchor points may be arranged. The greater the number of the first anchor points, the higher the compensation accuracy.

Next, S20 is described.

Figure 3:
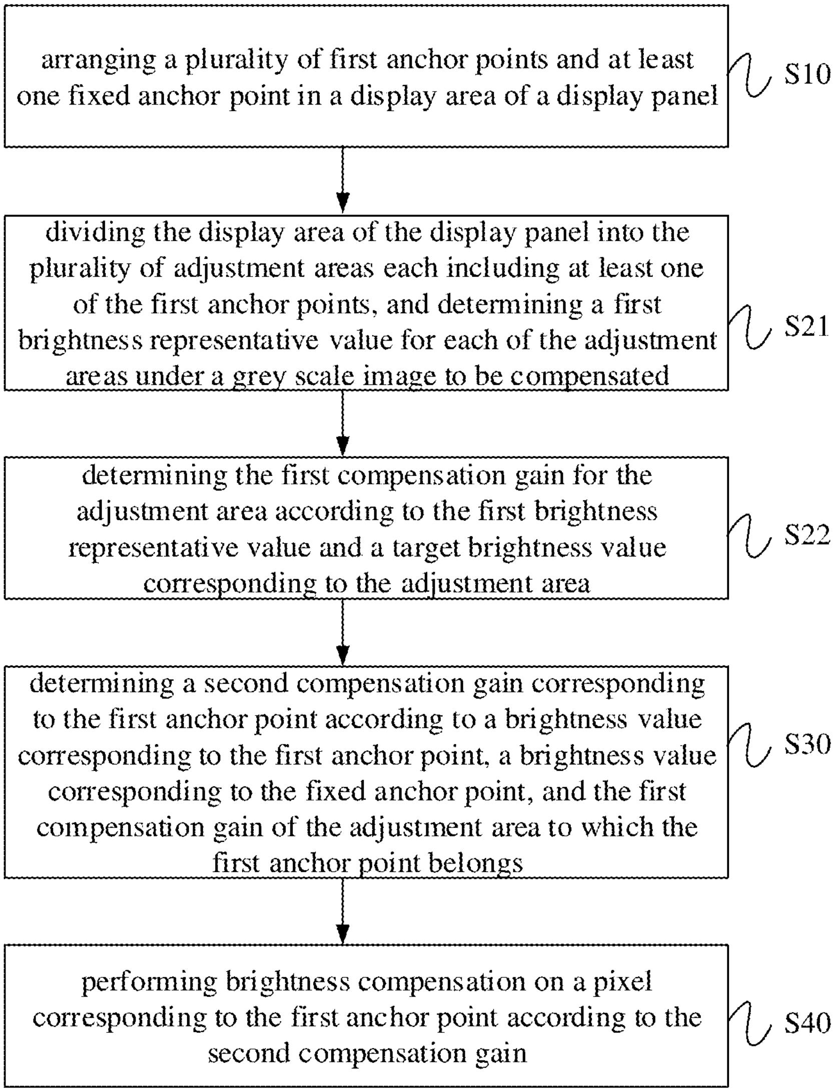
FIG. 3 to FIG. 4 show flowcharts of a method for compensating brightness according to another embodiment of the present application.

In some optional embodiments, as shown in FIG. 3, S20 may specifically include S21 to S22.

S21: dividing the display area of the display panel into the plurality of adjustment areas each including at least one of the first anchor points, and determining a first brightness representative value for each of the adjustment areas under the grey scale image to be compensated.

S22: determining the first compensation gain for the adjustment area according to the first brightness representative value and a target brightness value corresponding to the adjustment area.

Exemplarily, the first brightness representative value may represent a brightness trend of the adjustment area. For example, the first brightness representative value may represent whether the adjustment area is relatively bright or relatively dark.

Specific implementations of the above steps S21 to S22 will be described in detail below.

According to the embodiments of the present application, the first brightness representative value can characterize the brightness trend of the adjustment area, and thus the first compensation gain determined according to the first brightness representative value is more accurate.

Figure 4:
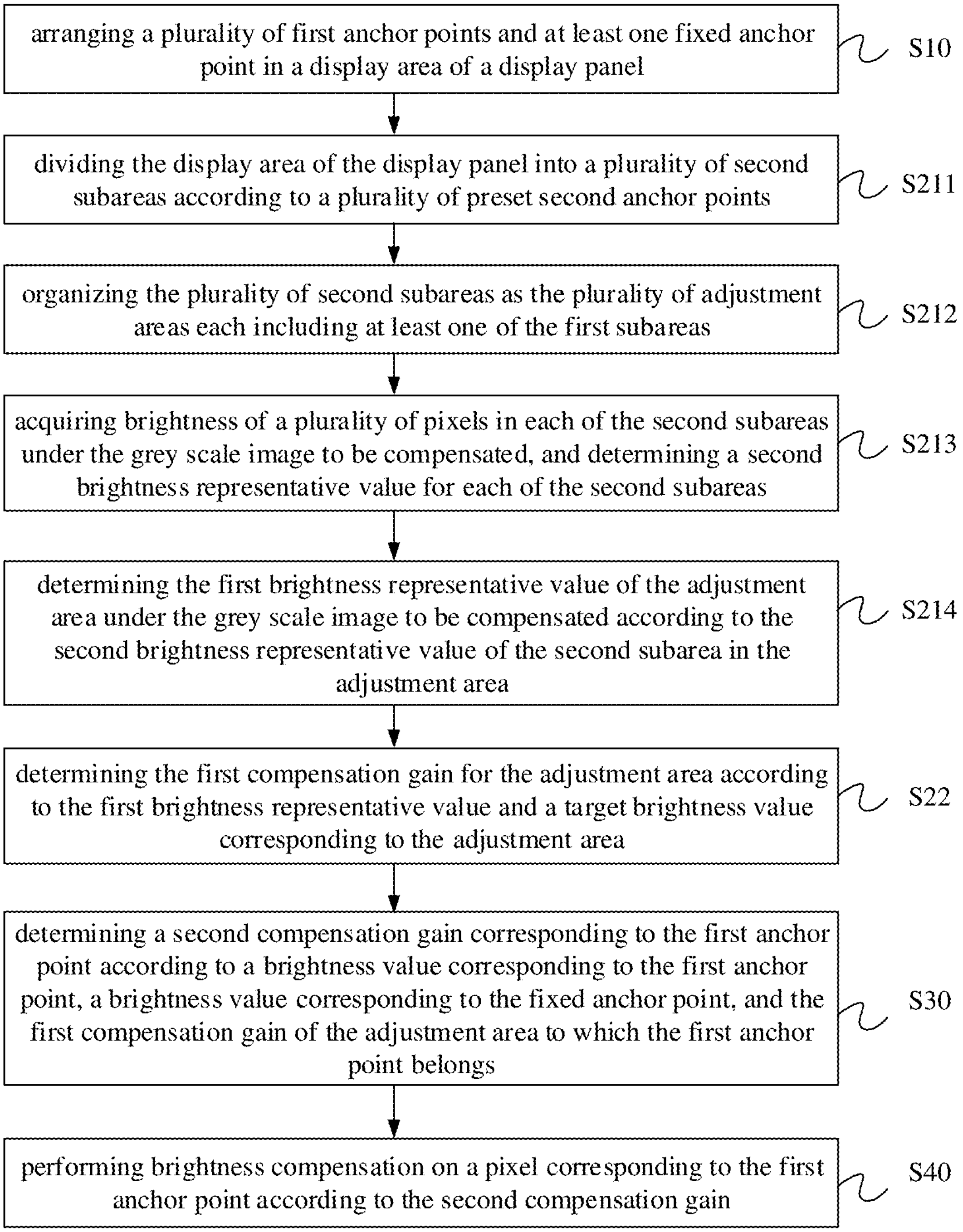

In some optional embodiments, as shown in FIG. 4, S21 may specifically include S211 to S214.

S211: dividing the display area of the display panel into a plurality of second subareas according to a plurality of preset second anchor points, in which the plurality of first anchor points and the at least one fixed anchor point divide the display area of the display panel into a plurality of first subareas each including at least one of the second subareas.

S212: organizing the plurality of second subareas as the plurality of adjustment areas each including at least one of the first subareas.

S213: acquiring brightness of a plurality of pixels in each of the second subareas under the grey scale image to be compensated, and determining a second brightness representative value for each of the second subareas.

S214: determining the first brightness representative value of the adjustment area under the grey scale image to be compensated according to the second brightness representative value of the second subarea in the adjustment area.

Specific implementations of the above steps S211 to S214 will be described in detail below.

According to the embodiments of the present application, a plurality of second anchor points divide the display area into a plurality of second subareas, each of the first subareas includes at least one of the second subareas, each of the adjustment areas includes at least one of the first subareas, and the first brightness representative value of the adjustment area is determined based on the second brightness representative value of the second subarea. In this way, the grey scale image to be compensated is segmented into subareas, the second brightness representative value of the second subarea in the adjustment area may characterize the brightness distribution pattern of the adjustment area, and thus the accuracy and representativeness of the first brightness representative value characterizing the brightness trend of the adjustment area can be improved.

In S211, the number of the preset second anchor points may be much greater than the number of the first anchor points. The greater the number of the second anchor points, the more representative the determined second brightness representative value, and thus the more accurate and representative the first brightness representative value.

The plurality of second anchor points may be uniformly distributed in the display area. For example, the plurality of second anchor points may be distributed in rows and columns.

Figure 5:
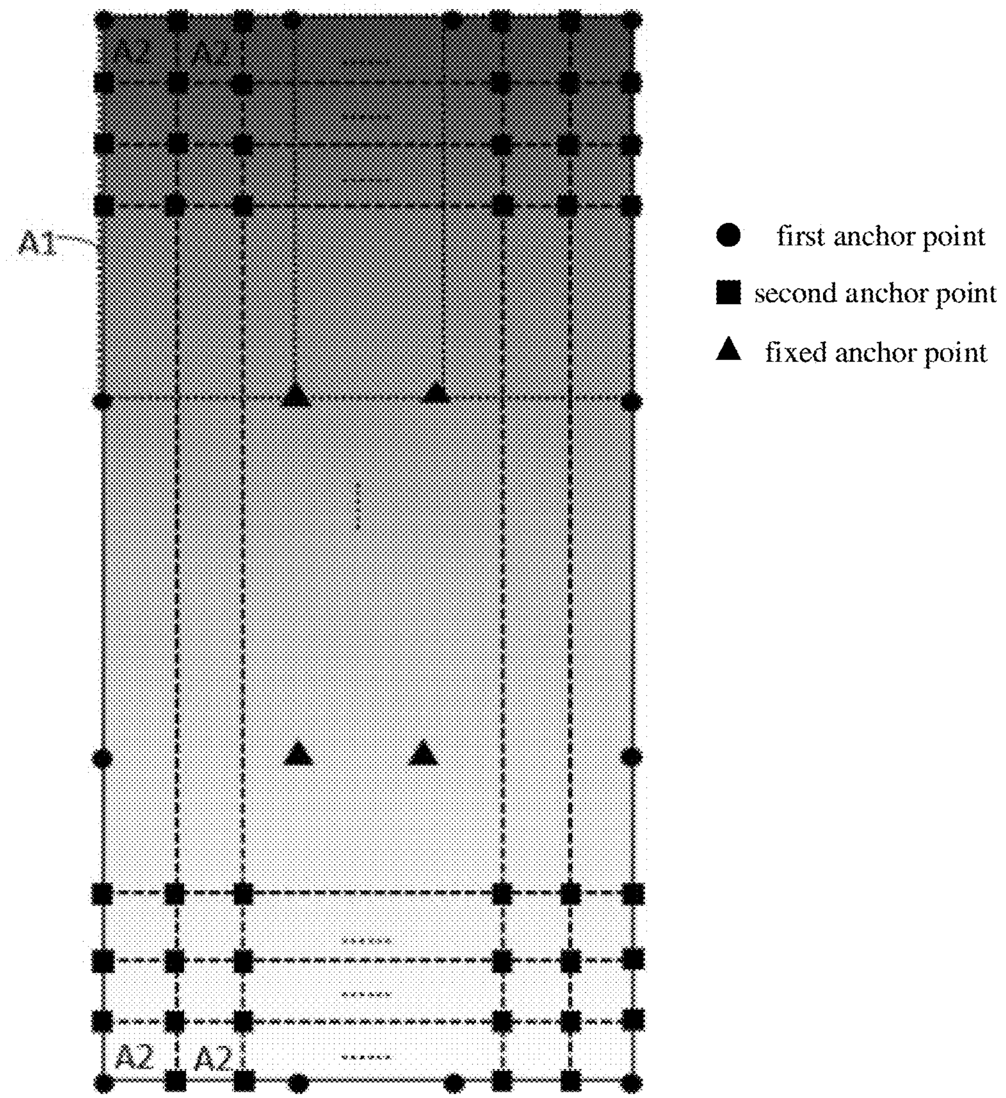
FIG. 5 shows a schematic diagram of an arrangement of anchor points in a method for compensating brightness according to another embodiment of the present application.

As an example, as shown in FIG. 5, in which the circular solid dot represents the first anchor point, the triangular solid dot represents the fixed anchor point, the square solid dot represents the second anchor point, and for example, the number of the second anchor points may be 135. For example, the display area may be divided into 9 columns (V) and 15 rows (H), and thus 135 second subareas are obtained. In order to distinguish the various areas, herein the first subarea is labeled as A1, and the second subarea is labeled as A2. The location of a portion of the second anchor points may overlap the location of the first anchor point, and the location of a portion of the second anchor points may overlap the location of the fixed anchor point. Each first subarea A1 may include 15 second subareas A2 in 5 rows and 3 columns.

In the accompanying drawings, for example, the first subarea, the second subarea and the adjustment area are all rectangular in shape, while these areas may be of other shapes, which is not limited in the present application.

In S212, the adjustment area may be understood as an area for which the brightness needs to be adjusted. The adjustment areas may be organized empirically. For example, an area close to the IC side is a lower area, the adjustment areas may be organized according to the brightness trend in an upper-middle-lower manner, and for example, an upper area and the lower area may be organized as the adjustment areas. For another example, under a condition that the left side and the right side of the upper area present different brightness trends, the upper area may be further divided in a left-right manner, and for example, the left area and the right area of the upper area may be further organized as two adjustment areas. As an example, the brightness trend of each first subarea may be determined according to the brightness of the various second subareas, and then the adjustment areas may be organized according to the brightness trend of each first subarea. The above description is merely to provide some examples, but not to limit the present application.

For example, the adjustment area may include at least one first subarea A1. In addition, the adjustment area includes at least one first anchor point, and the adjustment area may not include the fixed anchor point.

As an example, referring to FIG. 2, the display area AA may be divided into three adjustment areas, i.e., adjustment area AT1, adjustment area AT2, and adjustment area AT3. The first anchor points may include P11, P12, P13, P14, P21, P24, P31, P34, P41, P42, P43, and P44, and the fixed anchor points may include P22, P23, P32, and P33. Herein, the adjustment area AT1 may include the first anchor points P11, P12 and P21, the adjustment area AT2 may include the first anchor points P13, P14 and P24, and the adjustment area AT3 may include the first anchor points P31, P34, P41, P42, P43 and P44.

In S213, the grey scale image to be compensated may be any grey scale image. For example, the display panel may display gray scales 0-255, and the grey scale image to be compensated may be a white image or a monochrome image of any one of the grey scales. Taking the white image as an example, the acquired brightness of the pixels in the second subarea may include the brightness of sub-pixels of various colors, and then the second compensation gain for the sub-pixels of various colors corresponding to the first anchor point may be determined.

Figure 6:
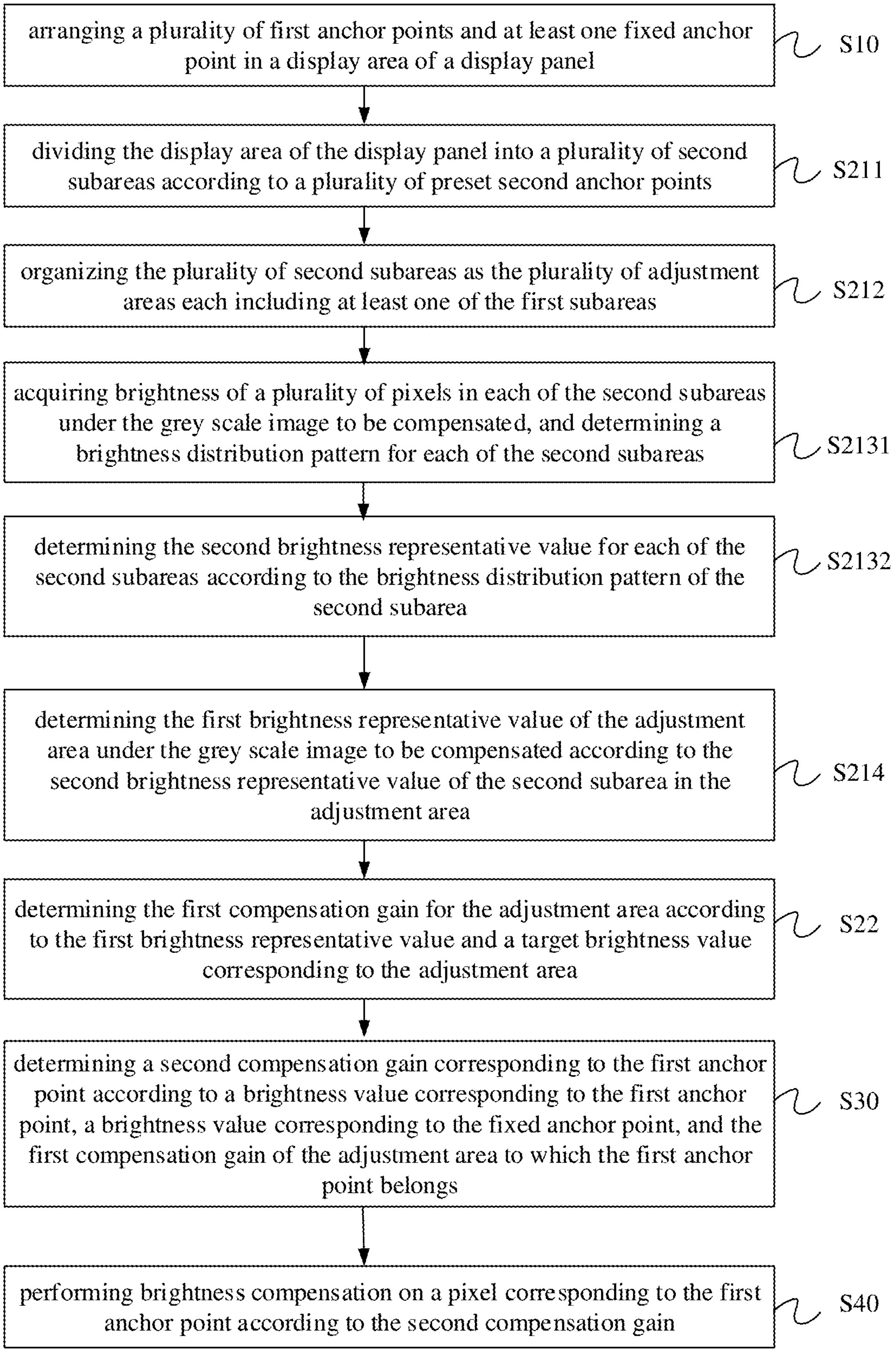
FIG. 6 to FIG. 8 show flowcharts of a method for compensating brightness according to yet another embodiment of the present application.

In some optional embodiments, as shown in FIG. 6, S213 may specifically include S2131 and S2132.

S2131: acquiring brightness of a plurality of pixels in each of the second subareas under the grey scale image to be compensated, and determining a brightness distribution pattern for each of the second subareas.

S2132: determining the second brightness representative value for each of the second subareas according to the brightness distribution pattern of the second subarea.

In the embodiments of the present application, the second brightness representative value of the second subarea is determined according to the brightness distribution pattern of the second subarea, so that the accuracy and representativeness of the second brightness representative value can be improved.

Exemplarily, for example, the display area includes 1080*2400 pixels, a plurality of second anchor points may divide the display area into 135 second subareas in 9 columns (V) and 15 rows (H), and each of the second subareas may include 120*160 pixels. For example, under the grey scale image to be compensated, the brightness values of the plurality of pixels in each of the second subareas may be acquired, the number of each of the brightness values is counted, then a weight is set for each of the brightness values according to the number of the brightness value, and the brightness values together with the weights are determined as the brightness distribution pattern of the second subarea.

For example, the brightness distribution pattern of the second subarea may be characterized by equation (1):

$$P\{X=x_k\}=p_k,\ k=1,2,3,4,5\ldots n \tag{1}$$

where $x_k$ represents the brightness value, $p_k$ represents the weight corresponding to the brightness value $x_k$, and n represents the number of the brightness value.

Further, the brightness of the various pixels in the second subarea may be weighted and summed, and the weighted sum is determined as the second brightness representative value of the second subarea.

For example, the second brightness representative value of the second subarea may be calculated using equation (2):

$$G_i(X)=\sum_{k=1}^{n} p_k * x_k \tag{2}$$

where $G_i(X)$ is the second brightness representative value of the second subarea.

In order to better understand how to determine the second brightness representative value, an example is given as follows: for example, the second subarea includes 10 pixels in total, in which the brightness values of 3 pixels are all L1, the brightness values of 5 pixels are all L2, and the brightness values of 2 pixels are all L3, then the weight of the brightness value L1 may be 3/10, the weight of the brightness value L2 may be 5/10, the weight of the brightness value L3 may be 2/10, and the second brightness representative value of the second subarea equals to 0.3*L1+0.5*L2+0.2*L3.

The above description is merely to provide an example, but not to limit the present application. For example, an average brightness value of the plurality of pixels in the second subarea may be determined as the second brightness representative value of the second subarea.

Figure 7:
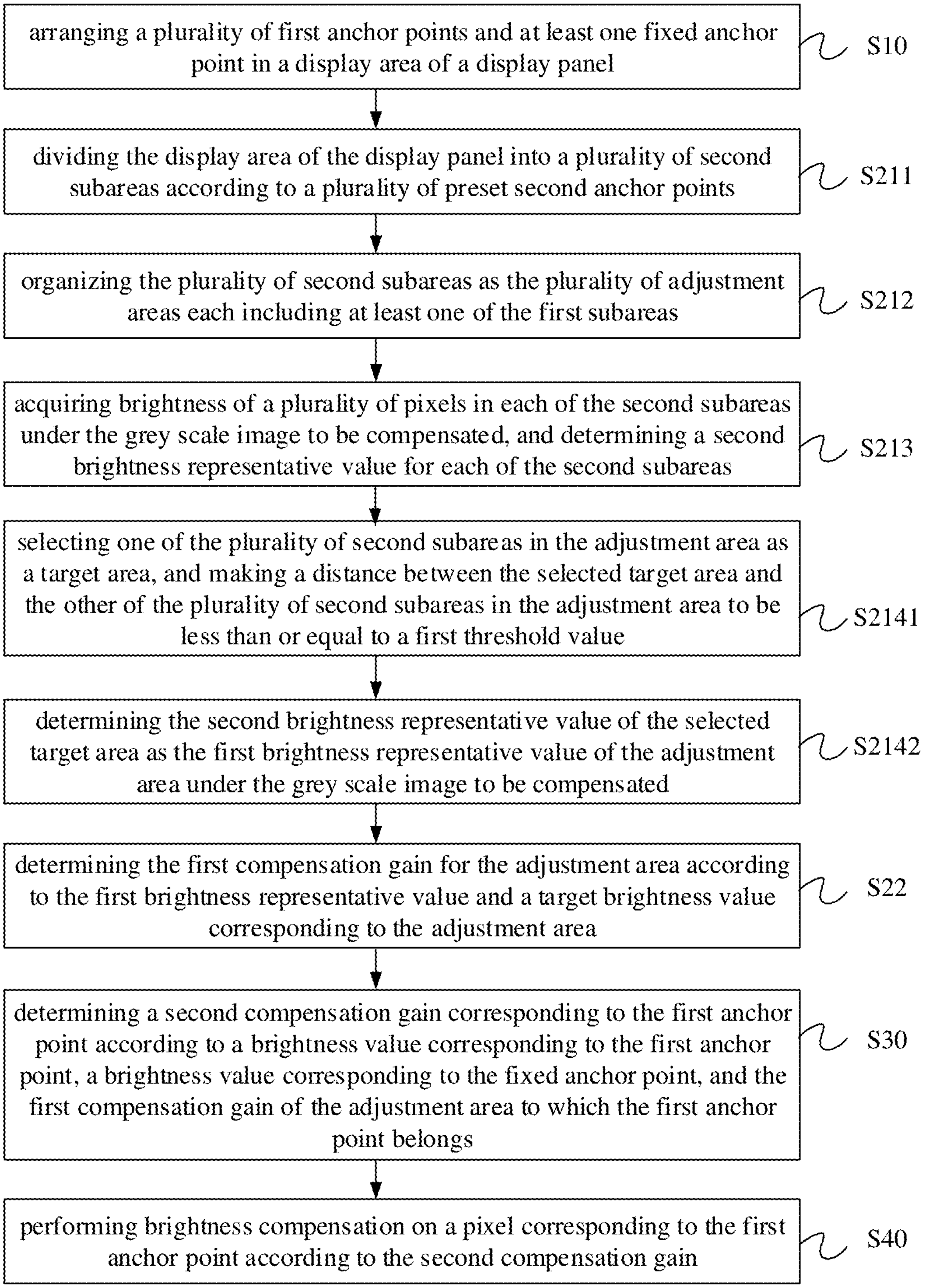

In some optional embodiments, the adjustment area includes a plurality of second subareas, and as shown in FIG. 7, S214 may specifically include S2141 and S2142.

S2141: selecting one of the plurality of second subareas in the adjustment area as a target area, and making a distance between the selected target area and the other of the plurality of second subareas in the adjustment area to be less than or equal to a first threshold value.

S2142: determining the second brightness representative value of the selected target area as the first brightness representative value of the adjustment area under the grey scale image to be compensated.

In the embodiments of the present application, the distance between the selected target area and the other of the plurality of second subareas in the adjustment area is less than or equal to the first threshold value, which may be understood as that the distance between the target area and the other of the plurality of second subareas in the adjustment area is the shortest, and thus the second brightness representative value corresponding to the target area can better represent the brightness trend of the adjustment area.

The specific value of the first threshold value may be set according to actual requirements, which is not limited in the present application.

Figure 8:
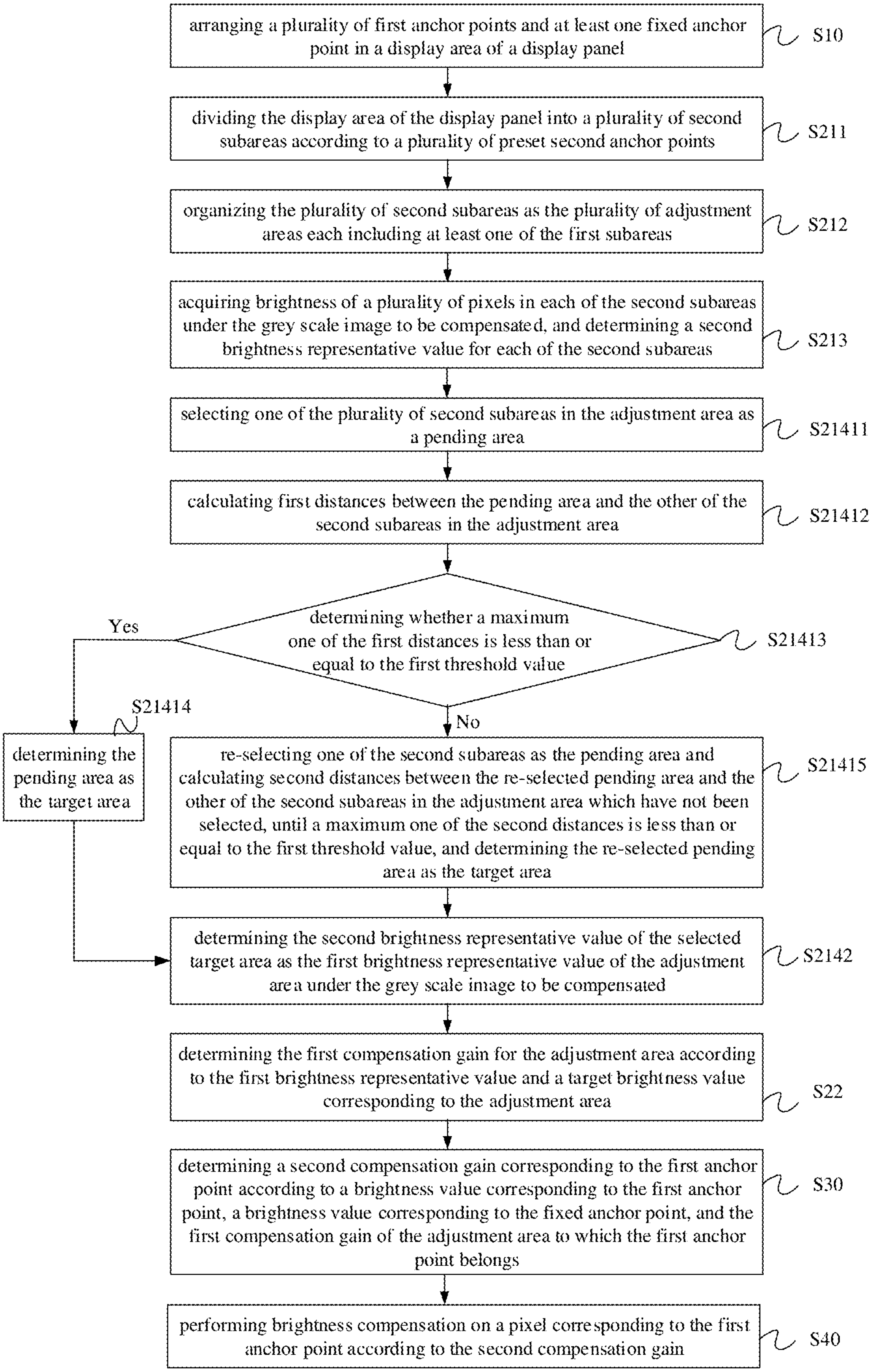

As an example, as shown in FIG. 8, S2141 may specifically include S21411 to S21415.

S21411: selecting one of the plurality of second subareas in the adjustment area as a pending area.

S21412: calculating first distances between the pending area and the other of the second subareas in the adjustment area.

S21413: determining whether a maximum one of the first distances is less than or equal to the first threshold value.

S21414: if the maximum one of the first distances is less than or equal to the first threshold value, determining the pending area as the target area.

S21415: if the maximum one of the first distances is not less than or equal to the first threshold value, re-selecting one of the second subareas as the pending area and calculating second distances between the re-selected pending area and the other of the second subareas in the adjustment area which have not been selected, until a maximum one of the second distances is less than or equal to the first threshold value, and determining the re-selected pending area as the target area.

In the embodiments of the present application, the second distance between the re-selected pending area and the second subareas which have been selected is not calculated, that is, if the second subareas which have been selected do not satisfy the requirements, these second subareas which have been selected are eliminated gradually, so that the calculation can be reduced to improve the data processing efficiency of the compensation algorithm, and the target area which satisfies the requirements can be selected according to the shortest path.

In S21411, a second subarea may be randomly selected from the plurality of second subareas in the adjustment area as the pending area, which is not limited in the present application.

In S21412, a representative coordinate value of each second subarea may be determined. For example, the coordinate value of the center point of the second subarea may be determined as the representative coordinate value of the second subarea, and then the first distances between the center point of the pending area and the center point of the other of the second subareas in the adjustment area are calculated. For example, if the adjustment area includes 10 second subareas, one of the 10 second subareas may be selected as the pending area, and then the first distances between the pending area and the other 9 second subareas are calculated.

In S21413, for example, the adjustment area includes 10 second subareas, it needs to be determined whether the maximum one of the 9 first distances is less than or equal to the first threshold value. Exemplarily, some of the plurality of first distances may be the same, but this does not affect the selection of the pending area.

In S21414, if the maximum one of the first distances is less than or equal to the first threshold value, the other of the first distances are all less than or equal to the first threshold value, therefore the path from the pending area to each of the second subarea is generally the shortest, and this pending area may be determined as the target area.

Exemplarily, re-selecting one of the second subareas as the pending area in S21415 may specifically include: calculating an average coordinate value of the other of the second subareas in the adjustment area which have not been selected, and determining a second subarea corresponding to the average coordinate value as the re-selected pending area. In this way, the pending area which satisfies the requirements can be determined quickly.

It may be appreciated that multiple selections may be performed during the selection of the pending area. For example, the adjustment area includes 10 second subareas, under a condition that the pending area selected for the first time dose not satisfy the requirements, a second selection is performed, in which one of the other 9 second subareas may be selected as the pending area and the second distances between this pending area and the other 8 second subareas which have not been selected are calculated; under a condition that the pending area selected for the second time dose not satisfy the requirements, a third selection is performed, in which one of the other 8 second subareas may be selected as the pending area and the second distances between this pending area and the other 7 second subareas which have not been selected are calculated; and so on.

Figure 9:
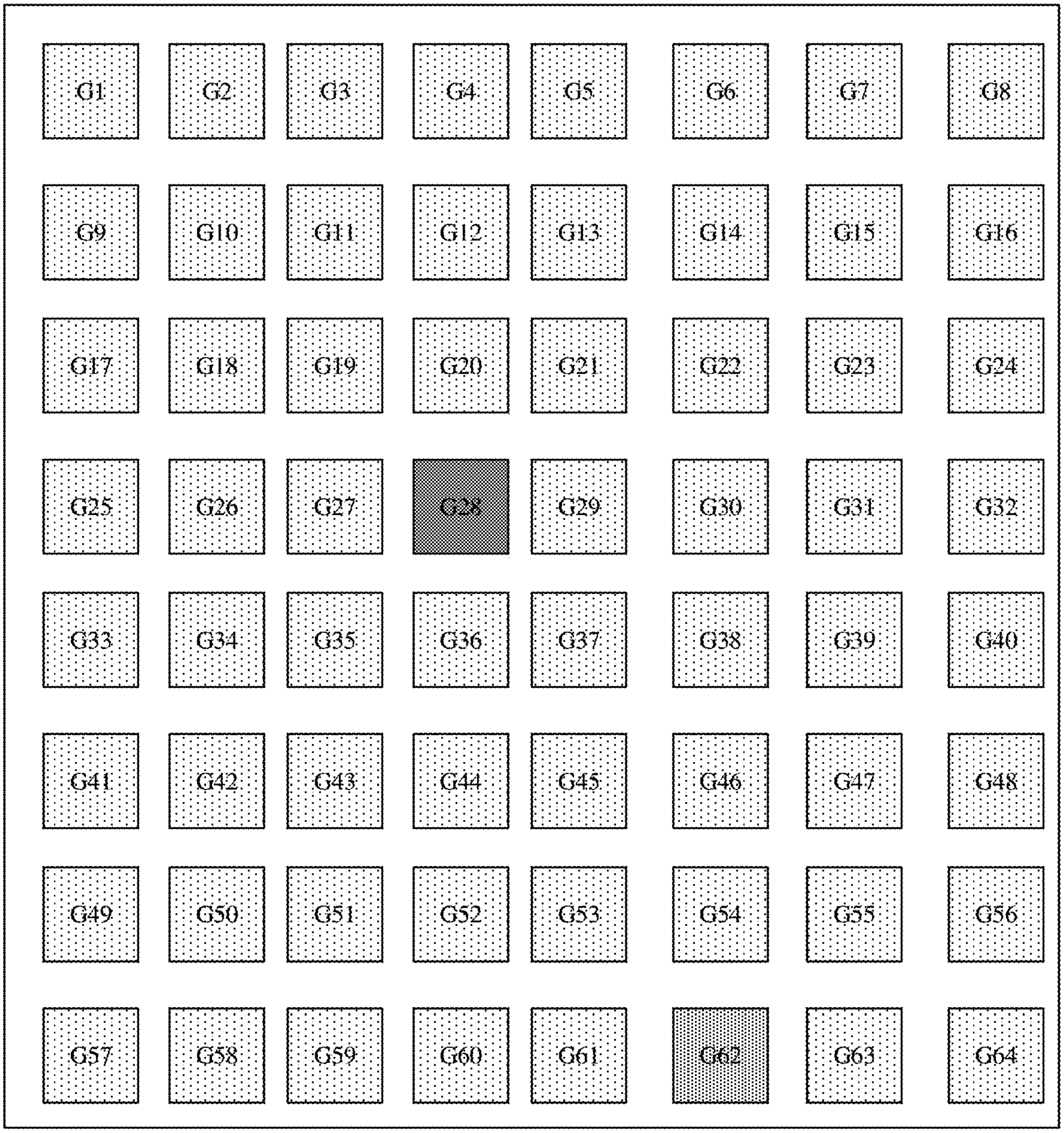
FIG. 9 shows a schematic diagram of an adjustment area in a method for compensating brightness according to an embodiment of the present application.

In order to better understand the process of selecting the pending area, an example is given. As shown in FIG. 9, the adjustment area includes 64 second subareas in 8 rows and 8 columns, the second subarea G62 is randomly selected as the pending area, and then the first distances between the second subarea G62 and a first data set (which includes the second subarea G1 to the second subarea G64, without the second subarea G62) are calculated, and 63 first distances in total are obtained. Further, the maximum one of the 63 first distances is compared with the first threshold value. If the maximum one of the 63 first distances is less than or equal to the first threshold value, the second area G62 is determined as the target area. If the maximum one of the 63 first distances is greater than the first threshold value, the average coordinate value of the first data set is calculated, and a second subarea corresponding to the average coordinate value is determined as the pending area, and for example, if the average coordinate value of the first data set corresponds to the second subarea G28, then the second subarea G28 is the re-selected pending area. The second distances between the second subarea G28 and a second data set (which includes the second subarea G1 to the second subarea G64, without the second subarea G28 and the second subarea G62) are then calculated, and 62 second distances in total are obtained. Similarly, the maximum one of the 62 second distances is compared with the first threshold value. If the second subarea G28 does not satisfy the requirements, the average coordinate value of the second data set is calculated, and the steps for re-selecting the pending area and calculating the second distances as described above are repeated.

The way of determining the target area as described above is merely an example, while the target area may be determined by other ways, and for example, the second subarea at the center of the adjustment area may be selected as the target area.

Next, S22 is described.

Figure 10:
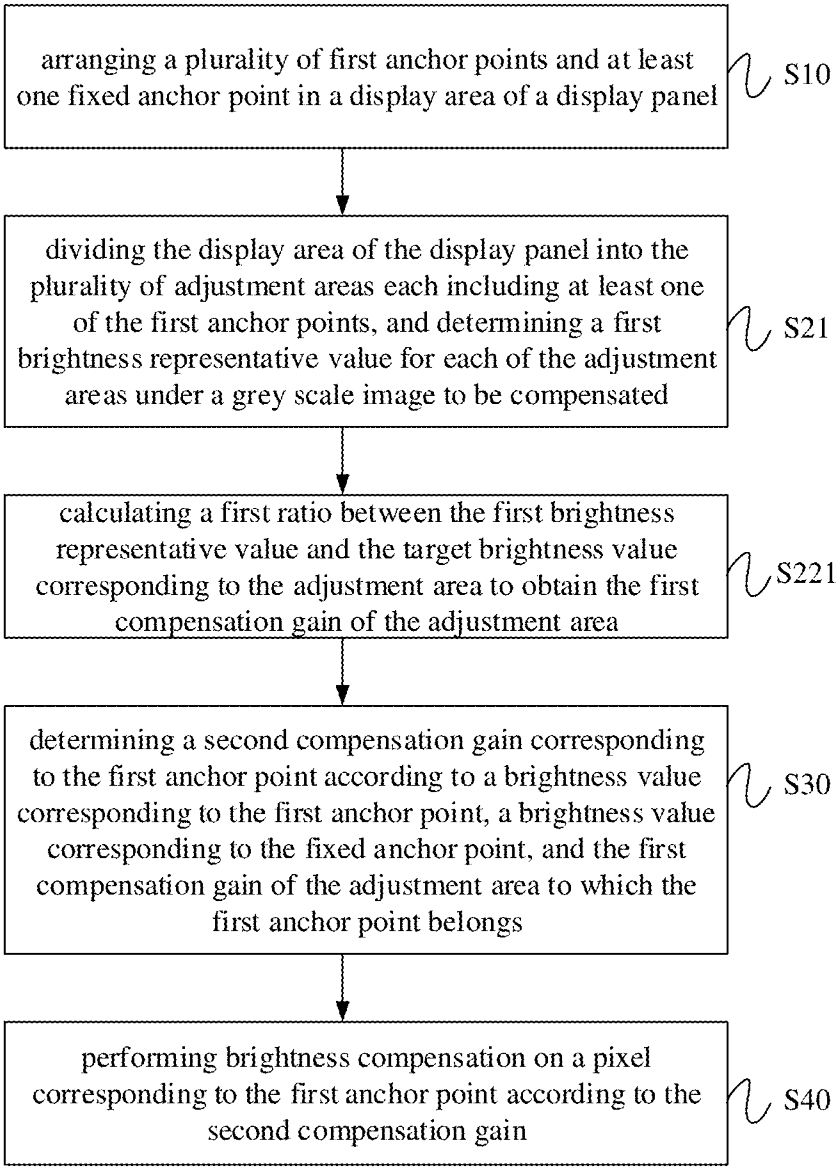
FIG. 10 shows a flowchart of a method for compensating brightness according to yet another embodiment of the present application.

In some optional embodiments, as shown in FIG. 10, S22 may specifically include S221.

S221: calculating a first ratio between the first brightness representative value and the target brightness value corresponding to the adjustment area to obtain the first compensation gain of the adjustment area.

The embodiments of the present application can quickly determine the first compensation gain for the adjustment area.

As an example, the target brightness value may include an average brightness value of a central area in the display area under the grey scale image to be compensated. The target brightness values corresponding to a plurality of adjustment areas may be the same.

Figure 11:
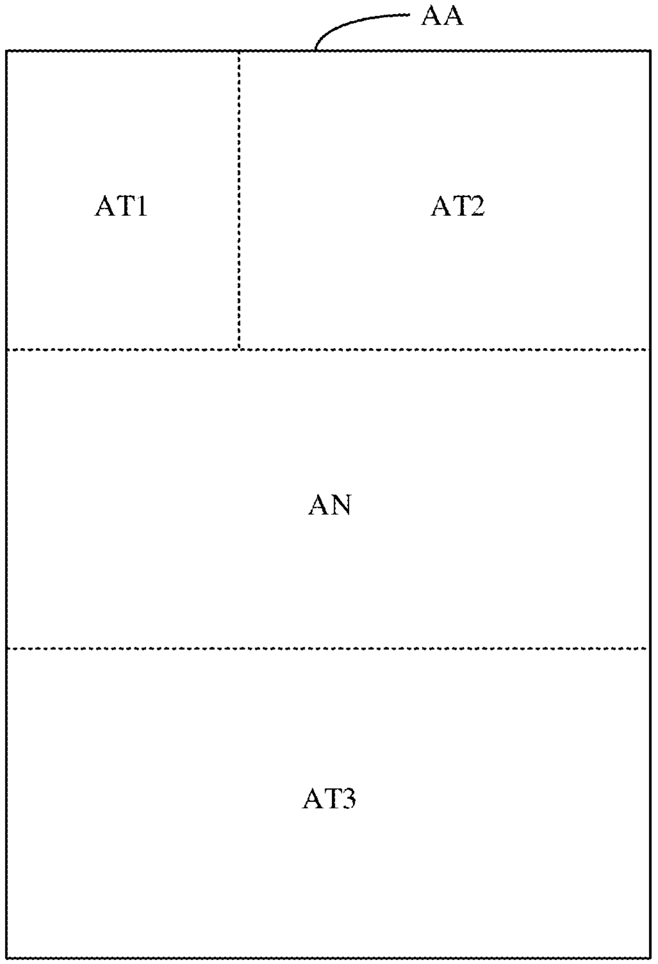
FIG. 11 shows a schematic diagram of subareas of a display panel in a method for compensating brightness according to an embodiment of the present application.

For example, as shown in FIG. 11, the display area AA may be divided into a fixed area AN and a plurality of adjustment areas, such as adjustment areas AT1, AT2, and AT3, in which the fixed area AN may be located in the middle of the display area and the adjustment areas AT1, AT2, and AT3 are located at two sides of the fixed area AN.

For example, if the first brightness representative value of the adjustment area AT1 is $G_{1x}$, the first brightness representative value of the adjustment area AT2 is $G_{2x}$, the first brightness representative value of the adjustment area AT3 is $G_{nx}$, and the average brightness value of the fixed area AN is G, then the first compensation gain of the adjustment area AT1 $Gain_{1x}=G_{1x}/G$, the first compensation gain of the adjustment area AT2 $Gain_{2x}=G_{2x}/G$, and the first compensation gain of the adjustment area AT3 $Gain_{nx}=G_{nx}/G$.

As another example, the target brightness value includes a required brightness value corresponding to the grey scale image to be compensated. For example, if the grey scale image to be compensated is a 255 grey scale image, the brightness value corresponding to the 255 grey scale may be determined in a preset gamma curve and determined as the target brightness value.

As yet another example, the at least one fixed anchor point may include at least three fixed anchor points, a plurality of the fixed anchor points enclose and form a fixed area, and the target brightness value may include an average brightness value of the fixed area under the grey scale image to be compensated. For example, as shown in FIG. 2, the average brightness value of the area enclosed by the fixed anchor points P22, P23, P32, and P33 under the grey scale image to be compensated may be determined as the target brightness value.

The above description is merely to provide some examples, while the target brightness value may be determined by other ways, which is not limited in the present application. Next, S30 is described.

Figure 12:
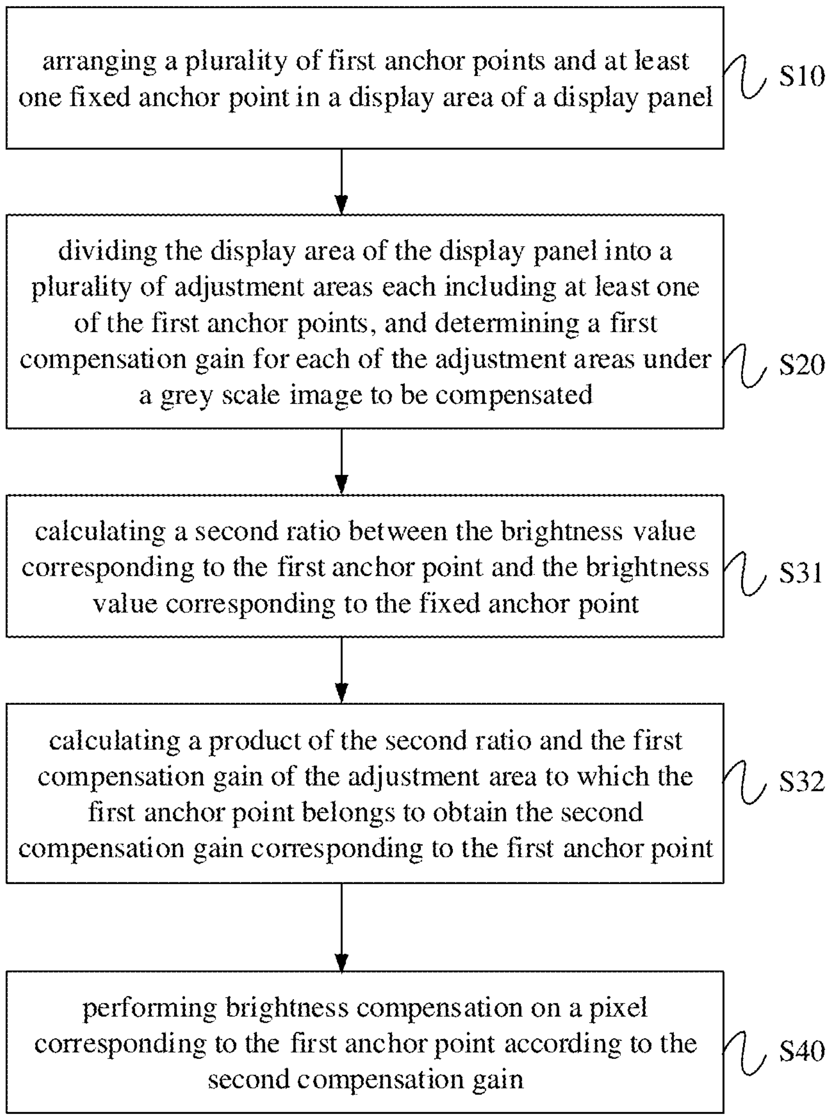
FIG. 12 shows a flowchart of a method for compensating brightness according to yet another embodiment of the present application.

In some optional embodiments, as shown in FIG. 12, S30 may specifically include S31 to S32.

S31: calculating a second ratio between the brightness value corresponding to the first anchor point and the brightness value corresponding to the fixed anchor point.

S32: calculating a product of the second ratio and the first compensation gain of the adjustment area to which the first anchor point belongs to obtain the second compensation gain corresponding to the first anchor point.

The embodiments of the present application can quickly and accurately determine the second compensation gain for the first anchor point.

As an example, the brightness value corresponding to the first anchor point may include a brightness value of a pixel at a location of the first anchor point, and the brightness value corresponding to the fixed anchor point may include a brightness value of a pixel at a location of the fixed anchor point. The pixel at the location of the first anchor point may include one or more pixels, and the pixel at the location of the fixed anchor point may include one or more pixels.

As another example, the brightness value corresponding to the first anchor point may include an average brightness value of pixels in an area where the first anchor point is located, and the brightness value corresponding to the fixed anchor point includes an average brightness value of pixels in an area where the fixed anchor point is located. For example, the area where the first anchor point is located may be determined by centering on the first anchor point and according to a first preset radius; and the area where the fixed anchor point is located may be determined by centering on the fixed anchor point and according to a second preset radius. The first preset radius and the second preset radius may be set according to actual requirements. The first preset radiuses respectively corresponding to a plurality of first anchor points may be the same, and the second preset radiuses respectively corresponding to a plurality of fixed anchor points may be the same.

As yet another example, the brightness value corresponding to the fixed anchor point may include a preset value, and the brightness value corresponding to the first anchor point may include a product of the preset value and a preset coefficient. The preset value and the preset coefficient may be set according to actual requirements. For example, the preset value may be a desired brightness value that the fixed anchor point can achieve, and the product of the preset value and the preset coefficient may be a desired brightness value that the first anchor point can achieve.

Exemplarily, in S31, the first anchor point may be adjacent to the fixed anchor point. For example, as shown in FIG. 2, the fixed anchor point P22 is adjacent to the first anchor points P11, P12, and P21, the fixed anchor point P23 is adjacent to the first anchor points P13, P14, and P24, the fixed anchor point P32 is adjacent to the first anchor points P31, P41, and P42, and the fixed anchor point P33 is adjacent to the first anchor points P34, P43, and P44.

Exemplarily, in S32, the product may be determined as the second compensation gain corresponding to the first anchor point. For example, the second compensation gain corresponding to the first anchor point P11 may be equal to $Gain_{1x}*L_{11}/L_{22}$, the second compensation gain corresponding to the first anchor point P13 may be equal to $Gain_{2x}*L_{13}/L_{23}$, and the second compensation gain corresponding to the first anchor point P31 may be equal to $Gain_{nx}*L_{31}/L_{32}$, and so on. Herein, $L_{11}$ represents the brightness value corresponding to the first anchor point P11, $L_{22}$ represents the brightness value corresponding to the fixed anchor point P22, $L_{13}$ represents the brightness value corresponding to the first anchor point P13, $L_{23}$ represents the brightness value corresponding to the fixed anchor point P23, $L_{31}$ represents the brightness value corresponding to the first anchor point P31, and $L_{32}$ represents the brightness value corresponding to the fixed anchor point P32. In this way, the second compensation gain corresponding to each first anchor point may be calculated. Next, S40 is described.

Exemplarily, in the present application, the first compensation gain and the second compensation gain may be corresponding to brightness. For example, an initial brightness of the pixel corresponding to the first anchor point may be acquired, and then a product of the initial brightness and the second compensation gain may be calculated and determined as the brightness to be displayed by the pixel corresponding to the first anchor point.

Exemplarily, the compensation gain corresponding to a pixel at a location other than the first anchor points may be determined using interpolation. For example, the compensation gain corresponding to a pixel at a location between the first anchor points P11 and P12 may be determined by linear interpolation based on the second compensation gains corresponding to the first anchor points P11 and P12. This is merely one example and not used to limit the present application.

Exemplarily, a pixel may include sub-pixels of different colors, and thus the second compensation gain may include second compensation gains respectively corresponding to the sub-pixels of different colors. In addition, under different grey scales, the specific value of the second compensation gain may vary.

Figure 13:
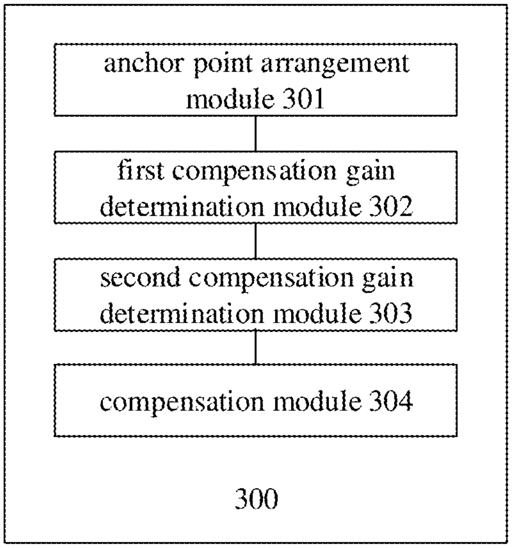
FIG. 13 shows a schematic structural diagram of an apparatus for compensating brightness according to an embodiment of the present application.

The embodiments of the present application further provide an apparatus for compensating brightness. As shown in FIG. 13, the apparatus 300 for compensating brightness according to the embodiments of the present application may include an anchor point arrangement module 301, a first compensation gain determination module 302, a second compensation gain determination module 303, and a compensation module 304.

The anchor point arrangement module 301 is configured to arrange a plurality of first anchor points and at least one fixed anchor point in a display area of a display panel.

The first compensation gain determination module 302 is configured to divide the display area of the display panel into a plurality of adjustment areas each including at least one of the first anchor points, and determine a first compensation gain for each of the adjustment areas under a grey scale image to be compensated.

The second compensation gain determination module 303 is configured to determine a second compensation gain corresponding to the first anchor point according to a brightness value corresponding to the first anchor point, a brightness value corresponding to the fixed anchor point, and the first compensation gain of the adjustment area to which the first anchor point belongs.

The compensation module 304 is configured to perform brightness compensation on a pixel corresponding to the first anchor point according to the second compensation gain.

In the apparatus for compensating brightness according to the embodiments of the present application, a plurality of first anchor points and at least one fixed anchor point are arranged, which means the grey scale image to be compensated is segmented, and not only the first compensation gain for the adjustment area is determined, but also the second compensation gain corresponding to the first anchor point is determined based on the first compensation gain, Therefore, the gain corresponding to the first anchor can be dynamically adjusted, so that an accurate, efficient, refined and highly targeted uniformity compensation can be achieved for different brightness trends, including abnormal brightness trends, and thus the display uniformity of the display panel is improved.

In some exemplary embodiments, the first compensation gain determination module 302 may be specifically configured to: divide the display area of the display panel into the plurality of adjustment areas each including at least one of the first anchor points, and determine a first brightness representative value for each of the adjustment areas under the grey scale image to be compensated; and determine the first compensation gain for the adjustment area according to the first brightness representative value and a target brightness value corresponding to the adjustment area.

In some exemplary embodiments, the first compensation gain determination module 302 may be specifically configured to: divide the display area of the display panel into a plurality of second subareas according to a plurality of preset second anchor points, in which the plurality of first anchor points and the at least one fixed anchor point divide the display area of the display panel into a plurality of first subareas each including at least one of the second subareas; organize the plurality of second subareas as the plurality of adjustment areas each including at least one of the first subareas; acquire brightness of a plurality of pixels in each of the second subareas under the grey scale image to be compensated, and determine a second brightness representative value for each of the second subareas; and determine the first brightness representative value of the adjustment area under the grey scale image to be compensated according to the second brightness representative value of the second subarea in the adjustment area.

In some exemplary embodiments, the first compensation gain determination module 302 may be specifically configured to: acquire brightness of a plurality of pixels in each of the second subareas under the grey scale image to be compensated, and determine a brightness distribution pattern for each of the second subareas; and determine the second brightness representative value for each of the second subareas according to the brightness distribution pattern of the second subarea.

In some exemplary embodiments, the first compensation gain determination module 302 may be specifically configured to: select one of the plurality of second subareas in the adjustment area as a target area, and make a distance between the selected target area and the other of the plurality of second subareas in the adjustment area to be less than or equal to a first threshold value; and determine the second brightness representative value of the selected target area as the first brightness representative value of the adjustment area under the grey scale image to be compensated.

In some exemplary embodiments, the first compensation gain determination module 302 may be specifically configured to: select one of the plurality of second subareas in the adjustment area as a pending area; calculate first distances between the pending area and the other of the second subareas in the adjustment area; determine whether a maximum one of the first distances is less than or equal to the first threshold value; if the maximum one of the first distances is less than or equal to the first threshold value, determine the pending area as the target area; and if the maximum one of the first distances is not less than or equal to the first threshold value, re-select one of the second subareas as the pending area and calculate second distances between the re-selected pending area and the other of the second subareas in the adjustment area which have not been selected, until a maximum one of the second distances is less than or equal to the first threshold value, and determine the re-selected pending area as the target area.

Exemplarily, re-selecting one of the second subareas as the pending area includes: calculating an average coordinate value of the other of the second subareas in the adjustment area which have not been selected, and determining a second subarea corresponding to the average coordinate value as the re-selected pending area.

In some exemplary embodiments, the first compensation gain determination module 302 may be specifically configured to: calculate a first ratio between the first brightness representative value and the target brightness value corresponding to the adjustment area to obtain the first compensation gain of the adjustment area.

Exemplarily, the target brightness value includes an average brightness value of a central area in the display area under the grey scale image to be compensated; or the target brightness value includes a required brightness value corresponding to the grey scale image to be compensated; or the at least one fixed anchor point includes at least three fixed anchor points, a plurality of the fixed anchor points enclose and form a fixed area, and the target brightness value includes an average brightness value of the fixed area under the grey scale image to be compensated.

In some exemplary embodiments, the second compensation gain determination module 303 may be specifically configured to: calculate a second ratio between the brightness value corresponding to the first anchor point and the brightness value corresponding to the fixed anchor point; calculate a product of the second ratio and the first compensation gain of the adjustment area to which the first anchor point belongs; and obtain the second compensation gain corresponding to the first anchor point according to the product.

Exemplarily, the brightness value corresponding to the first anchor point includes a brightness value of a pixel at a location of the first anchor point, and the brightness value corresponding to the fixed anchor point includes a brightness value of a pixel at a location of the fixed anchor point.

Exemplarily, the brightness value corresponding to the first anchor point includes an average brightness value of pixels in an area where the first anchor point is located, and the brightness value corresponding to the fixed anchor point includes an average brightness value of pixels in an area where the fixed anchor point is located.

Exemplarily, the brightness value corresponding to the fixed anchor point includes a preset value, and the brightness value corresponding to the first anchor point includes a product of the preset value and a preset coefficient.

Exemplarily, the first anchor points are located at an edge of the display area, and a plurality of the first anchor points surround the fixed anchor point.

Exemplarily, a plurality of the first anchor points are uniformly distributed at the edge of the display area.

The apparatus for compensating brightness according to the embodiments of the present application may be a device, a component in a terminal, an integrated circuit, or a chip. The apparatus may be a mobile electronic device or a non-mobile electronic device. Exemplarily, the mobile electronic device may be a cellular phone, a tablet computer, a laptop computer, a palmtop computer, an in-vehicle electronic device, a wearable device, an Ultra-mobile Personal Computer (UMPC), a netbook, or a Personal Digital Assistant (PDA), etc., and the non-mobile electronic device may be a server, a Network Attached Storage (NAS), a Personal Computer (PC), a Television (TV), a teller machine, or a kiosk, etc., which are not specifically limited herein.

The apparatus for compensating brightness according to the embodiments of the present application can implement the various processes in the embodiments of the method for compensating brightness as shown in FIG. 1, which will not be repeated herein.

Figure 14:
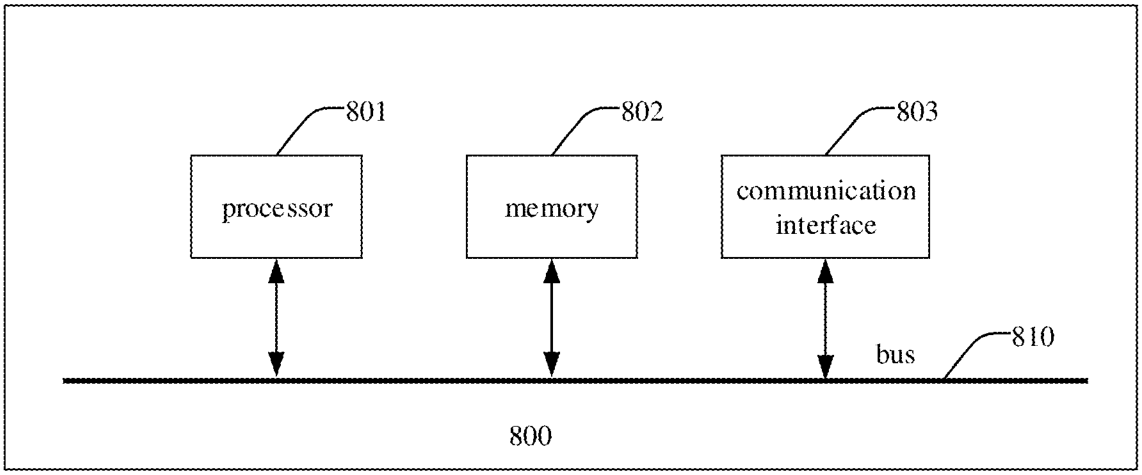
FIG. 14 shows a schematic structural diagram of an electronic device according to an embodiment of the present application.

FIG. 14 shows a schematic structural diagram of hardware of an electronic device according to the embodiments of the present application.

The electronic device 800 may include a processor 801 and a memory 802 storing computer program instructions.

Specifically, the above processor 801 may include a central processing unit (CPU), or an Application Specific Integrated Circuit (ASIC), or one or more integrated circuits that may be configured to implement the embodiments of the present application.

The memory 802 may include a mass memory configured to store data or instructions. By way of example and not limitation, the memory 802 may include a Hard Disk Drive (HDD), a floppy disk drive, a flash memory, an optical disk, a magnetic disk, a magnetic tape, or a Universal Serial Bus (USB) drive, or a combination thereof. Where appropriate, the memory 802 may include a removable or non-removable (or fixed) medium. Where appropriate, the memory 802 may be internal or external to an integrated gateway disaster recovery device. In particular embodiments, the memory 802 is a non-volatile solid state memory. In particular embodiments, the memory 802 includes a read-only memory (ROM). Where appropriate, the ROM may be a mask programmed ROM, a programmable ROM (PROM), an erasable PROM (EPROM), an electrically erasable PROM (EEPROM), an electrically alterable ROM (EAROM), or a flash memory, or a combination thereof. Exemplarily, the memory may include a non-volatile transient memory.

The processor 801 reads and executes the computer program instructions stored in the memory 802 to implement the method for compensating brightness in any one of the above embodiments.

In one example, the electronic device may further include a communication interface 803 and a bus 810. Herein, as shown in FIG. 14, the processor 801, the memory 802, and the communication interface 803 are connected and communicate with each other via the bus 810.

The communication interface 803 is mainly configured to achieve the communication among the various modules, apparatuses, units, and/or devices in the embodiments of the present application.

The bus 810 includes hardware, software, or both, to couple the components of the electronic device with each other. By way of example and not limitation, the bus may include an Accelerated Graphics Port (AGP) or other graphics buses, an Enhanced Industry Standard Architecture (EISA) bus, a Front Side Bus (FSB), a Hyper Transport (HT) interconnect, an Industry Standard Architecture (ISA) bus, an infinite bandwidth interconnect, a Low Pin Count (LPC) bus, a memory bus, a Micro Channel Architecture (MCA) bus, a Peripheral Component Interconnect (PCI) bus, a PCI-Express (PCI-X) bus, a Serial Advanced Technology Attachment (SATA) bus, a Video Electronics Standards Association Local Bus (VLB) bus, or other suitable buses, or a combination thereof. Where appropriate, the bus 810 may include one or more buses. Although specific buses are described and illustrated in the embodiments of the present application, the present application contemplates any suitable bus or interconnect.

The electronic device may execute the method for compensating brightness according to the embodiments of the present application, so as to implement the method for compensating brightness and the apparatus for compensating brightness described in conjunction with FIGS. 1 and 13.

The embodiments of the present application further provide a computer-readable storage medium storing a computer program thereon, in which the computer program, when executed by a processor, may implement the method for compensating brightness in the above embodiments and can achieve the same technical effect, which is not repeated herein. Herein, the above computer-readable storage medium may include a Read-Only Memory (ROM), a Random Access Memory (RAM), a magnetic disk, or a compact disc, which is not limited herein.

The functional block as shown in the structure diagram described above may be embodied as hardware, software, firmware or a combination thereof. When embodied as hardware, the functional block may be, for example, an electronic circuit, an Application Specific Integrated Circuit (ASIC), an appropriate firmware, plug-in, function card, and the like. When embodied as software, the element of the present application is a program or code segment that is configured to perform a desired task. The program or code segment may be stored in a machine-readable medium, or transmitted over a transmission medium or a communication link by means of a data signal carried in a carrier. The "computer-readable storage medium" may include any medium capable of storing or transmitting information. Example of the computer-readable storage medium include an electronic circuit, a semiconductor memory device, a ROM, a flash memory, an erasable ROM (EROM), a floppy disk, a CD-ROM, an optical disk, a hard disk, a fiber-optic medium, an RF link, and the like. The code segment may be downloaded via a computer network such as the Internet, Intranet.

According to the embodiments of the present application, the computer-readable storage medium may be a non-transitory computer-readable storage medium.

It should also be noted that the exemplary embodiments in the present application describe some methods or systems based on a series of steps or apparatuses. However, the present application is not limited to the above order of the steps, i.e., the steps may be performed in the order described in the embodiments or in a different order than the order in the embodiments, or several steps may be performed simultaneously.

Aspects of the present application are described above with reference to the flowchart and/or block diagram of the method, apparatus (system), and computer program product according to the embodiments of the present application. It should be understood that each block in the flowchart and/or block diagram and a combination of the blocks in the flowchart and/or block diagram may be implemented by computer program instructions. These computer program instructions may be provided to a processor of a general-purpose computer, a specialized computer, or other programmable data processing device to produce a machine, so that these instructions, executed by the processor of the computers or other programmable data processing device, enable the implementation of the function/action specified in one or more blocks of the flowchart and/or block diagram. Such a processor may be, but is not limited to, a general purpose processor, a specialized processor, a special application processor, or a field programmable logic circuit. It should also be understood that each block in the block diagram and/or flowchart and a combination of the blocks in the block diagram and/or flowchart may also be implemented by specialized hardware that performs specified function or action, or by a combination of specialized hardware and computer instructions.

The above embodiments of the present application do not exhaustively describe all the details, nor do they limit the present application to the specific embodiments as described. Obviously, according to the above description, many modifications and changes can be made. These embodiments are selected and particularly described in the specification to better explain the principles and practical applications of the present application, so that a person skilled in the art is able to utilize the present application and make modifications based on the present application. The present application is limited only by the claims and the full scope and equivalents of the claims.

What is claimed is:

1. A method for compensating brightness, comprising:

arranging a plurality of first anchor points and at least one fixed anchor point in a display area of a display panel;

dividing the display area of the display panel into a plurality of adjustment areas each comprising at least one of the first anchor points, and determining a first compensation gain for each of the adjustment areas under a grey scale image to be compensated;

determining a second compensation gain corresponding to the first anchor point according to a brightness value corresponding to the first anchor point, a brightness value corresponding to the fixed anchor point, and the first compensation gain of the adjustment area to which the first anchor point belongs; and performing brightness compensation on a pixel corresponding to the first anchor point according to the second compensation gain, wherein dividing the display area of the display panel into the plurality of adjustment areas each comprising at least one of the first anchor points, and determining the first compensation gain for each other of the adjustment areas under the grey scale image to be compensated comprise:

dividing the display area of the display panel into the plurality of adjustment areas each comprising at least one of the first anchor points, and determining a first brightness representative value for each of the adjustment areas under the grey scale image to be compensated; and determining the first compensation gain for the adjustment area according to the first brightness representative value and a target brightness value corresponding to the adjustment area, wherein dividing the display area of the display panel into the plurality of the adjustment areas each comprising at least one of the first anchor points, and determining the first brightness representative value for each of the adjustment areas under the grey scale image to be compensated comprise:

dividing the display area of the display panel into a plurality of second subareas according to a plurality of preset second anchor points, wherein the plurality of the first anchor points and the at least one fixed anchor point divide the display area of the display panel into a plurality of first subareas each comprising at least one of the second subareas;

organizing the plurality of the second subareas as the plurality of adjustment areas each comprising at least one of the first subareas;

acquiring brightness of a plurality of pixels in each of the second subareas under the grey scale image to be compensated, and determining a second brightness representative value for each of the second subareas; and determining the first brightness representative value of the adjustment area under the grey scale image to be compensated according to the second brightness representative value of the second subarea in the adjustment area, wherein the adjustment area comprises a plurality of second subareas, and determining the first brightness representative value of the adjustment area under the grey scale image to be compensated according to the second brightness representative value of the second subarea in the adjustment area comprises:

selecting one of the plurality of second subareas in the adjustment area as a target area, and making a distance between the selected target are and the other of the plurality of second subareas in the adjustment area to be less than or equal to a first threshold value; and determining the second brightness representative value of the selected target area as the first brightness representative value of the adjustment area under the grey scale image to be compensated.

2. The method according to claim 1, wherein the first brightness representative value represents a brightness trend of the adjustment area.

3. The method according to claim 1, wherein acquiring brightness of a plurality of pixels in each of the second subareas under the grey scale image to be compensated, and determining the second brightness representative value for each of the second subareas comprise:

acquiring brightness of a plurality of pixels in each of the second subareas under the grey scale image to be compensated, and determining a brightness distribution pattern for each of the second subareas; and determining the second brightness representative value for each of the second subareas according to the brightness distribution pattern of the second subarea.

4. The method according to claim 3, wherein acquiring brightness of a plurality of pixels in each of the second subareas under the grey scale image to be compensated, and determining the brightness distribution pattern for each of the second subareas comprise:

acquiring brightness values of the plurality of pixels in each of the second subareas under the grey scale image to be compensated;

counting, for any of the second subareas, a number of each of the brightness values in the second subarea;

setting a weight corresponding to each of the brightness values according to the number of the brightness value; and determining the brightness distribution pattern of the second subarea according to the brightness values and the weights of the brightness values in the second subarea.

5. The method according to claim 1, wherein selecting one of the plurality of second subareas in the adjustment area as the target area, and making a distance between the selected target area and the other of the plurality of second subareas in the adjustment area to be less than or equal to the first threshold value comprise:

selecting one of the plurality of second subareas in the adjustment area as a pending area;

calculating first distances between the pending area and the other of the second subareas in the adjustment area;

determining whether a maximum one of the first distances is less than or equal to the first threshold value;

if the maximum one of the first distances is less than or equal to the first threshold value, determining the pending area as the target area; and if the maximum one of the first distances is not less than or equal to the first threshold value, re-selecting one of the second subareas as the pending area and calculating second distances between the re-selected pending area and the other of the second subareas in the adjustment area which have not been selected, until a maximum one of the second distances is less than or equal to the first threshold value, and determining the re-selected pending area as the target area.

6. The method according to claim 5, wherein re-selecting one of the second subareas as the pending area comprises:

calculating an average coordinate value of the other of the second subareas in the adjustment area which have not been selected, and determining a second subarea corresponding to the average coordinate value as the re-selected pending area.

7. The method according to claim 1, wherein determining the first compensation gain for the adjustment area according to the first brightness representative value and the target brightness value corresponding to the adjustment area comprises:

calculating a first ratio between the first brightness representative value and the target brightness value corresponding to the adjustment area to obtain the first compensation gain of the adjustment area.

8. The method according to claim 1, wherein the target brightness value comprises an average brightness value of a central area in the display area under the grey scale image to be compensated; or the target brightness value comprises a required brightness value corresponding to the grey scale image to be compensated; or the at least one fixed anchor point comprises at least three fixed anchor points, a plurality of the fixed anchor points enclose and form a fixed area, and the target brightness value comprises an average brightness value of the fixed area under the grey scale image to be compensated.

9. The method according to claim 1, wherein determining the second compensation gain corresponding to the first anchor point according to the brightness value corresponding to the first anchor point, the brightness value corresponding to the fixed anchor point, and the first compensation gain of the adjustment area to which the first anchor point belongs comprises:

calculating a second ratio between the brightness value corresponding to the first anchor point and the brightness value corresponding to the fixed anchor point; and calculating a product of the second ratio and the first compensation gain of the adjustment area to which the first anchor point belongs to obtain the second compensation gain corresponding to the first anchor point.

10. The method according to claim 1, wherein the brightness value corresponding to the first anchor point comprises a brightness value of a pixel at a location of the first anchor point, and the brightness value corresponding to the fixed anchor point comprises a brightness value of a pixel at a location of the fixed anchor point.

11. The method according to claim 1, wherein the brightness value corresponding to the first anchor point comprises an average brightness value of pixels in an area where the first anchor point is located, and the brightness value corresponding to the fixed anchor point comprises an average brightness value of pixels in an area where the fixed anchor point is located.

12. The method according to claim 1, wherein the brightness value corresponding to the fixed anchor point comprises a preset value, and the brightness value corresponding to the first anchor point comprises a product of the preset value and a preset coefficient.

13. The method according to claim 1, wherein the first anchor points are located at an edge of the display area, and a plurality of the first anchor points surround the fixed anchor point.

14. The method according to claim 1, wherein a plurality of the first anchor points are uniformly distributed at the edge of the display area.

15. An electronic device, comprising:

a processor and a memory storing computer program instructions, wherein the processor, when executing the computer program instructions, implements the method for compensating brightness according to claim 1.

16. A non-transitory computer-readable storage medium storing computer program instructions thereon, wherein the computer program instructions, when executed by a processor, implement the method for compensating brightness according to claim 1.

17. An apparatus for compensating brightness, comprising:

an anchor point arrangement module configured to arrange a plurality of first anchor points and at least one fixed anchor point in a display area of a display panel;

a first compensation gain determination module configured to divide the display area of the display panel into a plurality of adjustment areas each comprising at least one of the first anchor points, and determine a first compensation gain for each of the adjustment areas under a grey scale image to be compensated;

a second compensation gain determination module configured to determine a second compensation gain corresponding to the first anchor point according to a brightness value corresponding to the first anchor point, a brightness value corresponding to the fixed anchor point, and the first compensation gain of the adjustment area to which the first anchor point belongs; and a compensation module configured to perform brightness compensation on a pixel corresponding to the first anchor point according to the second compensation gain, wherein the first compensation gain determination module is specifically configured to: divide the display area of the display panel into the plurality of adjustment areas each comprising at least one of the first anchor points, and determine a first brightness representative value for each of the adjustment areas under grey scale image to be compensated; and determine the first compensation gain for the adjustment area according to the first brightness representative value and a target brightness value corresponding to the adjustment area, the first compensation gain determination module is specifically configured to: divide the display area of the display panel into a plurality of the second subareas according to a plurality of preset second anchor points, wherein the plurality of the first anchor points and the at least one fixed anchor point divide the display area of the display panel into a plurality of the first subareas each comprising at least one of the second subareas; organize the plurality of the second subareas as the plurality of adjustment areas each comprising at least one of the first subareas; acquire brightness of a plurality of pixels in each of the second subareas under the grey scale image to be compensated, and determine a second brightness representative value for each of the second subareas; and determine the first brightness representative value of the adjustment area under the grey scale image to be compensated according to the second brightness representative value of the second subarea in the adjustment area, and wherein the adjustment area comprises a plurality of the second subareas, and the first compensation gain determination module is specifically configured to: select one of the plurality of second subareas in the adjustment area as a target area, and make a distance between the selected target area and the other of the plurality of the second subareas in the adjustment area to be less than or equal to a first threshold value; and determine the second brightness representative value of the selected target area as the first brightness representative value of the adjustment area under the grey scale image to be compensated.

18. The apparatus according to claim 17, wherein the first brightness representative value represents a brightness trend of the adjustment area.

19. The apparatus according to claim 17, wherein the first compensation gain determination module is specifically configured to:

select one of the plurality of second subareas in the adjustment area as a pending area;

calculate first distances between the pending area and the other of the second subareas in the adjustment area;

determine whether a maximum one of the first distances is less than or equal to the first threshold value;

if the maximum one of the first distances is less than or equal to the first threshold value, determine the pending area as the target area; and if the maximum one of the first distances is not less than or equal to the first threshold value, re-select one of the second subareas as the pending area and calculate second distances between the re-selected pending area and the other of the second subareas in the adjustment area which have not been selected, until a maximum one of the second distances is less than or equal to the first threshold value, and determine the re-selected pending area as the target area.

20. The apparatus according to claim 19, wherein the first compensation gain determination module is configured to re-select one of the second subareas as the pending area by: calculating an average coordinate value of the other of the second subareas in the adjustment area which have not been selected, and determining a second subarea corresponding to the average coordinate value as the re-selected pending area.

* * * * *